(12) United States Patent
Guthrie et al.

(10) Patent No.: US 9,791,049 B2
(45) Date of Patent: Oct. 17, 2017

(54) TOILET FLAPPER VALVE WITH ADJUSTABLE MOUNTS AND ASSEMBLY

(71) Applicant: LAVELLE INDUSTRIES, INC., Burlington, WI (US)

(72) Inventors: Kevin J. Guthrie, Wind Lake, WI (US); Michael Dean, Genoa City, WI (US)

(73) Assignee: Lavelle Industries, Inc., Burlington, WI (US)

( * ) Notice: Subject to any disclaimer, the term of this patent is extended or adjusted under 35 U.S.C. 154(b) by 85 days.

(21) Appl. No.: 14/799,119

(22) Filed: Jul. 14, 2015

(65) Prior Publication Data

US 2016/0010317 A1    Jan. 14, 2016

Related U.S. Application Data

(60) Provisional application No. 62/024,126, filed on Jul. 14, 2014.

(51) Int. Cl.
*E03D 1/35* (2006.01)
*F16K 1/20* (2006.01)
*E03D 1/30* (2006.01)

(52) U.S. Cl.
CPC ............... *F16K 1/20* (2013.01); *E03D 1/306* (2013.01)

(58) Field of Classification Search
USPC .............. 4/378; 251/298, 300; 137/270, 448
See application file for complete search history.

(56) References Cited

U.S. PATENT DOCUMENTS

| 5,090,066 A * | 2/1992 | Schoepe | E03D 1/142 24/22 |
|---|---|---|---|
| 2009/0144888 A1 | 6/2009 | Han | |
| 2014/0059756 A1* | 3/2014 | Guthrie | E03D 1/306 4/393 |

* cited by examiner

*Primary Examiner* — Lauren Crane
(74) *Attorney, Agent, or Firm* — Joseph S. Heino; James E. Lowe, Jr.

(57) ABSTRACT

An improved toilet flapper valve is used to cover and seal a main flush valve orifice, which flapper valve comprises a pair of rotatable legs and leg clips having two-way adjustment capabilities and which serve to function as mounting arms. The two-way adjustment of the rotatable leg clips allows for use of the same flapper valve with a variety of makes and models of flush valves, and flush valves having pegs that may be spaced apart so as to adjust for pegs that may have different diameters or that may be separated from one another by different distances depending on the flush valve used in the toilet. The flapper valve of the present invention also includes a variably-adjustable air outlet capability.

6 Claims, 4 Drawing Sheets

SECTION A-A ured flush toilets. More particularly, the
TOILET FLAPPER VALVE WITH ADJUSTABLE MOUNTS AND ASSEMBLY This Application claims the benefit of U.S. Provisional Application No. 62/024,126, filed Jul. 14, 2014.

FIELD OF THE INVENTION

The present invention relates generally to indoor plumbing and gravity-operated flush toilets. More particularly, the present invention relates to flapper valves that are used in such toilets and to an improved flapper valve and assembly of the type that has variably adjustable mounts such that the flapper valve is attachable to a variety of flush valve housings. Further, the two-way adjustment of the rotatable leg clips allows for use of the same flapper valve with a variety of makes and models of flush valves, and flush valves having pegs that may be spaced apart so as to adjust for pegs that may have different diameters or that may be separated from one another by different distances, depending on the flush valve used in the toilet.

BACKGROUND OF THE INVENTION

Conventional gravity-operated flush toilets have several basic components. The porcelain or china components include a bowl and a water tank mounted on top of a rear portion of the bowl. The bowl and tank can be separate pieces bolted together to form a two-piece toilet. Other gravity-operated flush toilets are made as a one-piece toilet in which the bowl and tank are made as one continuous integral piece of china.

More importantly, the plumbing components of a gravity-operated flush toilet include a fill valve in the tank which is connected to a water supply line, a flush valve surrounding a drain hole in the bottom of the tank that communicates with the bowl, and a flapper valve that normally closes and seals the flush valve or, more precisely, the main flush valve orifice.

Toilet flapper valves are typically formed as a single structure having a rim for sealing the main flush valve orifice with the flapper valve rim following flushing. The flapper valve is often formed of a soft elastomeric material and is hinged to allow the valve to be pivotally moved upwardly and away from the main flush valve orifice by means of a chain that is connected to the flush handle on the outside of the tank. Once the tank empties, the flapper valve then returns to a position where it seals the main flush valve orifice, the rim of soft elastomeric material forming a sealing area about that main flush valve orifice.

The hinged toilet flapper valve mentioned above is typically secured to the flush valve by virtue of a pair of spaced apart parallel mounting arms. The mounting arms also typically include apertures, the apertures being used to rotatably connect the flapper valve to pegs that form part of the flush valve. Depending on the make and model of toilet tank, the size of its flush valve determines how far apart the mounting arms must be in order to accommodate a specific size of flapper valve for that flush valve. That is, the two-way adjustment of the rotatable leg clips of the present invention allows for use of the same flapper valve with a variety of makes and models of flush valves, and flush valves having pegs that may be spaced apart so as to adjust for pegs that may have different diameters or that may be separated from one another by different distances depending on the flush valve used in the toilet.

Located forwardly of the flapper valve mounting arms is also a ballast structure which controls the buoyancy of the flapper valve. The buoyancy of a flapper valve is an important function because it determines how much or how little water is used to empty the water tank upon flushing, thus creating water conservancy issues. The buoyancy of the flapper valve is determined by how quickly air is allowed to escape from the ballast. One way that the buoyancy of the flapper valve ballast can be controlled is by controlling the rate at which air within the ballast can flow out of the ballast. This can be done by creating and/or adjusting the size of an aperture at a point within the flapper valve ballast.

In the experience of this inventor, flapper valves of current manufacture do not provide an easy-to-use and adjustable flapper valve which combines both functionalities into a single structure.

SUMMARY OF THE INVENTION

Accordingly, a primary objective of the device of the present invention is to provide a new, useful and non-obvious improved toilet flapper valve that can be used to cover and seal the main flush valve orifice, which flapper valve comprises a pair of rotatable legs and leg clips having two-way adjustment capabilities and which serve to function as the "mounting arms" described above. Significantly, the two-way adjustment of the rotatable leg clips allows for use of the same flapper valve with a variety of makes and models of flush valves, and flush valves having pegs that may be spaced apart so as to adjust for pegs that may have different diameters or that may be separated from one another by different distances depending on the flush valve used in the toilet. The flapper valve of the present invention also includes a variably-adjustable air outlet capability.

The foregoing and other features of the improved flapper valve of the present invention will be apparent from the detailed description that follows.

DETAILED DESCRIPTION

Figure 1:
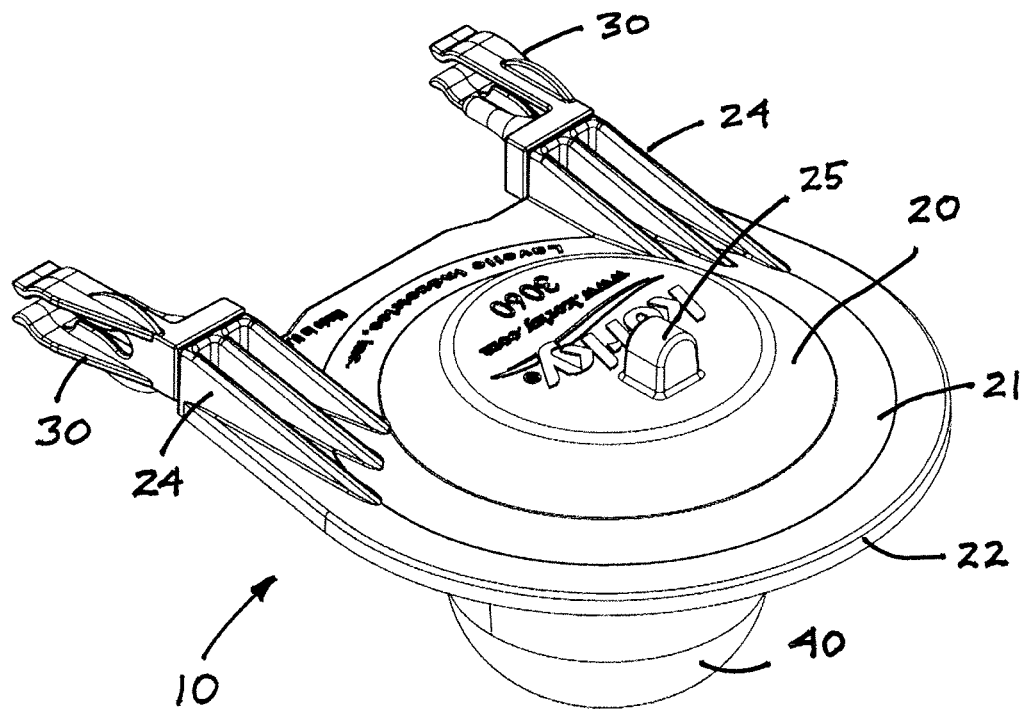
FIG. 1 is a top, front and left side perspective view of one embodiment of an improved flapper valve that is constructed in accordance with the present invention.
Figure 2:
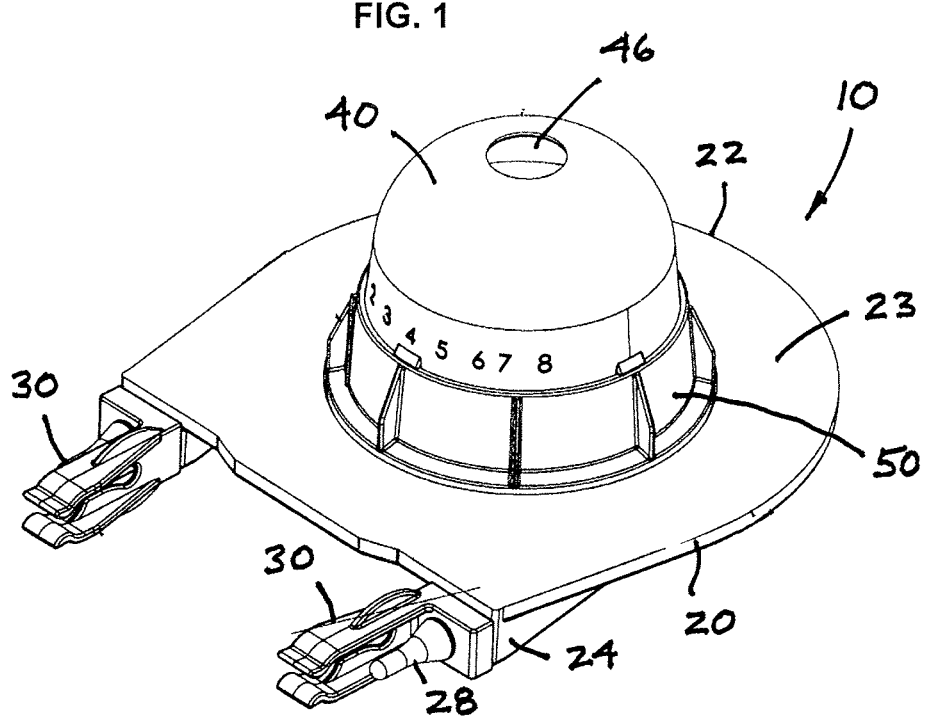
FIG. 2 is a bottom, rear and right side perspective view of the flapper valve shown in FIG. 1.

Referring now to the drawings in detail, wherein like-numbered elements refer to like elements throughout, FIGS.

1 and 2 generally illustrate a preferred embodiment of an improved flapper valve, generally identified 10, that is constructed in accordance with the present invention. The improved flapper valve 10 is the type that is intended to be used with a toilet flush valve and main flush valve orifice (not shown). As illustrated, the improved flapper valve 10 is comprised of four primary elements: a flapper body 20; a pair of mounting legs 30 disposed rearwardly of the flapper body 20; a cone 40 disposed below the flapper body 20; and a rotating vent band 50 disposed below the flapper body 20 and about the cone 40.

The flapper body 20 is typically made of an elastomeric material such as real or synthetic rubber having a suitable durometer or softness. In the preferred embodiment, the flapper body 20 is comprised of a real rubber material for suitable sealing with chemical resistance by virtue of CHLORAZONE® additive (CHLORAZONE is a registered trademark of Lavelle Industries, Inc. The flapper body 20 has a top surface 21, a bottom surface 23 and a circumferential peripheral lip 22.

Forwardly of the top surface 21 of the flapper body 20 and extending upwardly from that top surface 21 is a connection structure 25. The connection structure 25 typically includes an aperture (not shown) to receive a hook and chain-like structure (also not shown) for lifting the flapper valve 10 upwardly during the initiation of the flush cycle of the toilet. The peripheral lip 22 is configured to mate with the valve seat (also not shown) of the main flush valve orifice to close off water flow through that orifice.

Figure 8:
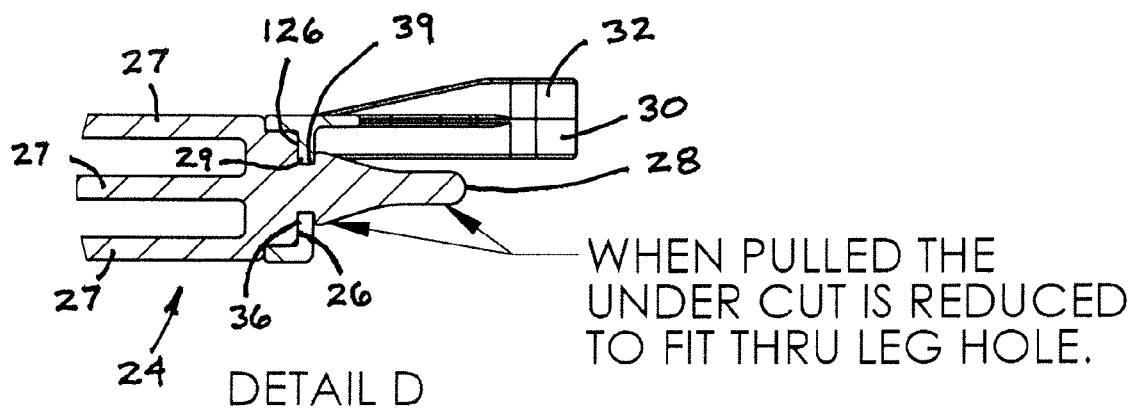
FIG. 8 is an enlarged top and partially sectioned view of the leg clip mounting structure in accordance with the present invention.

Extending rearwardly of the flapper body 20 and also disposed on the top surface 21 thereof is a pair of spaced-apart parallel leg clip mounting structures 24. Each mounting structure 24 comprises a rearward flat 26 and a frustroconical retainer 28 extending rearwardly from the flat 26. See FIGS. 3 and 8. The retainer 28 comprises a peripheral groove 29 that is disposed immediately adjacent the rearward-facing surface 126 of the rearward flat 26. Extending forwardly of the rearward flat 26 is a plurality of support ribs 27. The mounting structures 24 and all of their respective component structures are integrally formed as part of the flapper body 20.

Figure 3:
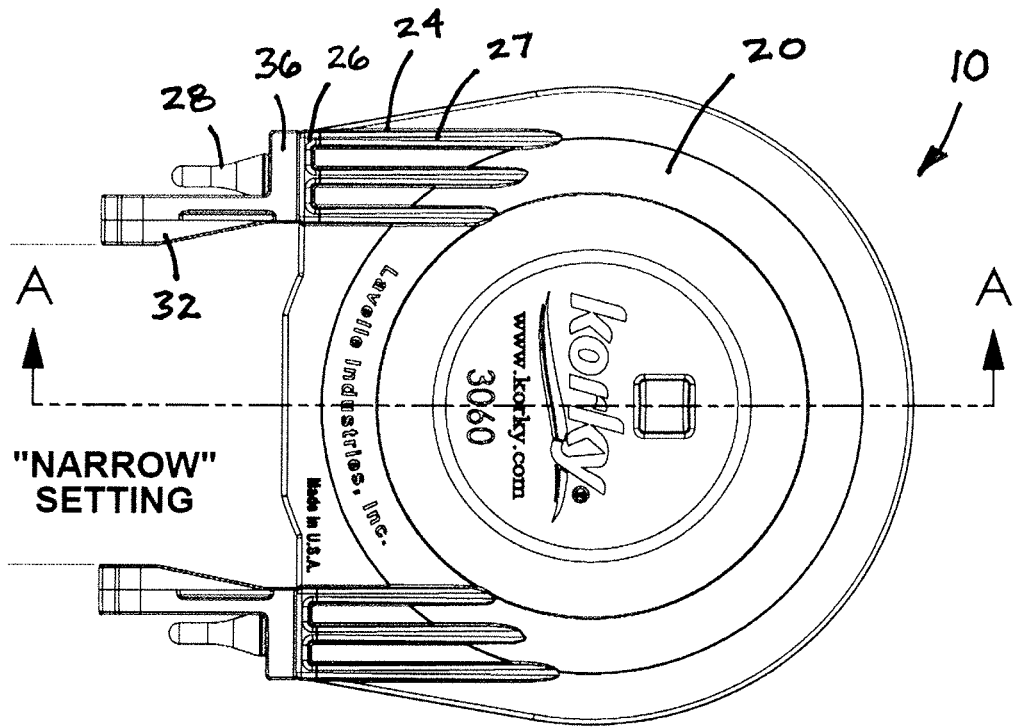
FIG. 3 is a top plan view of the flapper valve illustrated in FIG. 1 and showing the mounting legs in a "narrow setting" position.
Figure 4:
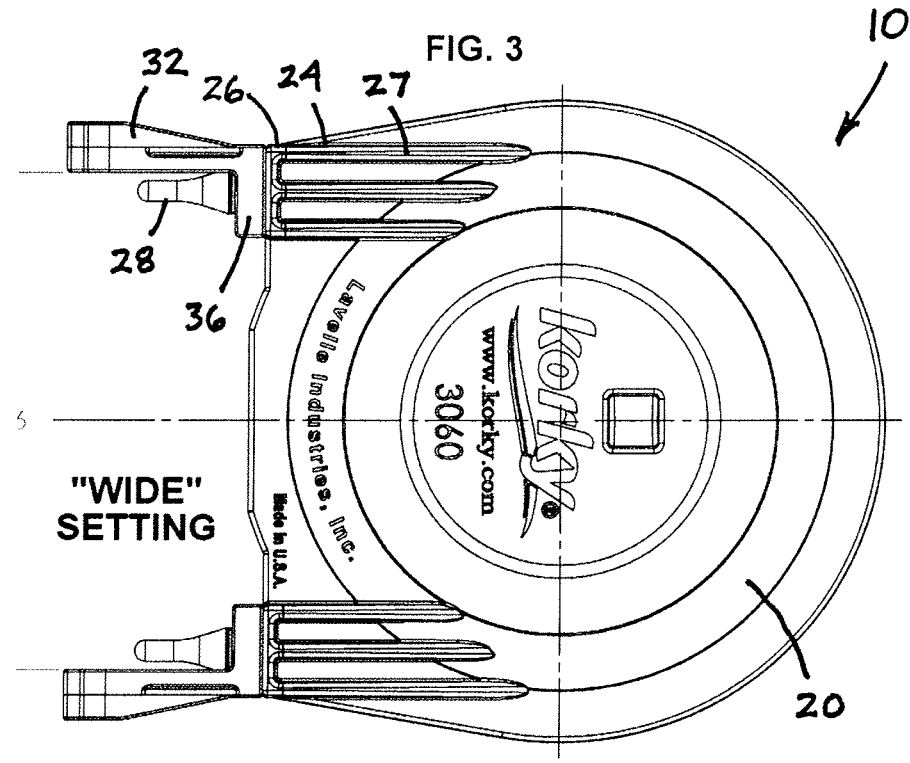
FIG. 4 is a view similar to that illustrated in FIG. 3 and showing the mounting legs in a "wide setting" position.

Attachable to each flat 26 of the leg clip mounting structures 24 is a mounting leg 30. The mounting leg 30 is a substantially L-shaped structure having a forward facing flat 36, which flat 36 has a hole 39 defined in it. The hole 39 is configured to receive the retainer 28 of the flapper body 20, the hole 39 capturing the retainer 28 via the peripheral groove 29. The retainer 28, like the remainder of the flapper body 20, is made of rubber which allows the retainer 28 to collapse when pulled on to pass through the hole 39 in the flat 36 of the leg 30. Once captured, the mounting leg 30 is rotatable about the axis of the retainer 28 such that the mounting legs 30 can be rotated inwardly and set in a "narrow setting" position, as is shown in FIG. 3, or rotated outwardly and set in a "wide setting" position, as is shown in FIG. 4.

Figure 5:
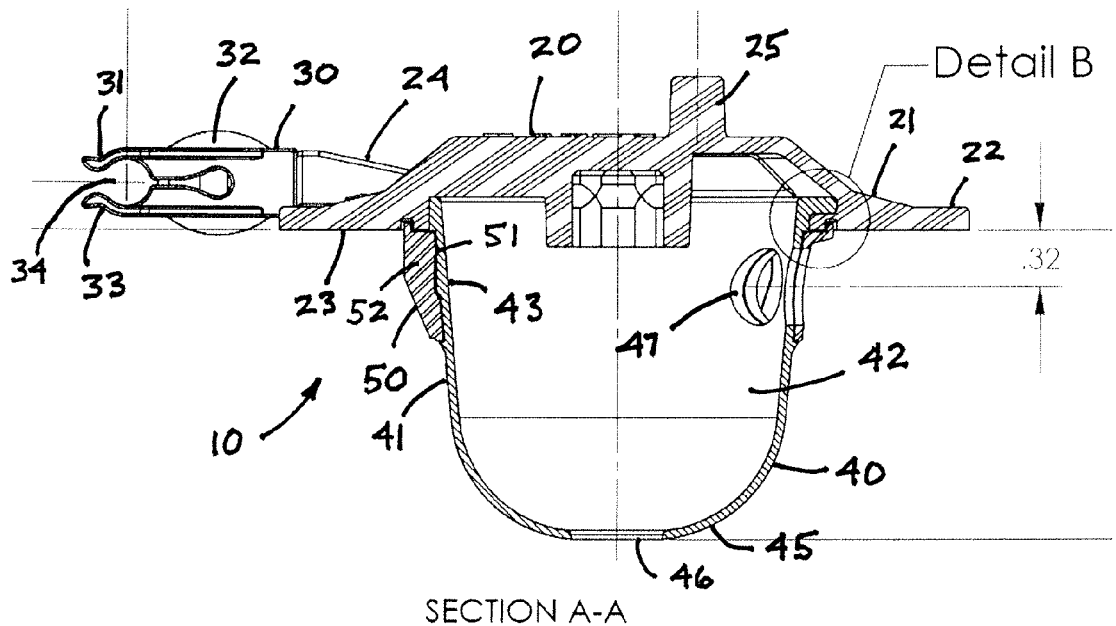
FIG. 5 is a cross-sectioned left side elevational view of the flapper valve shown in FIG. 1 taken along line A-A of FIG. 3.

Extending rearwardly from the flat 36 is a clip portion 32, the clip portion 32 being disposed substantially perpendicular to the flat 36. The clip portion 32 comprises a first clip member 31 and a second clip member 33 which, together, provide a pincer action such that the mounting legs 30 can "capture" the pegs (not shown) of a flush valve (also not shown) of conventional manufacture within an opening 34 formed between the clip members 31, 33 to rotatably connect the flapper valve 10 to the flush valve. See FIG. 5. This allows the mounting legs 30 to rotate the flapper valve 10 when the flush valve is actuated. It should also be appreciated that the size of the mounting legs 30 can be altered to accommodate flush valve pegs of different diameters. That is, a mounting leg 30 having a wider or narrower opening 34 is intended to be included within the scope of this invention.

Figures 6, 7:
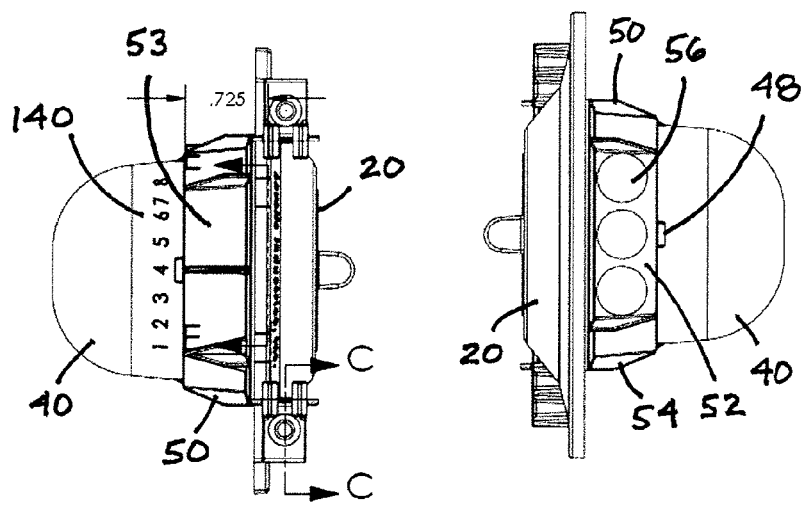
FIG. 6 is a rear elevational view of the flapper valve shown in FIG. 1.
FIG. 7 is a front elevational view of the flapper valve shown in FIG. 1.

Extending upwardly from the bottom surface 23 of the flapper body 20 is a round and circumferential captive portion 127. This captive portion 127 of the flapper body 20 is configured to receive a portion of the cone 40 within a first groove 128 and a portion of the vent band 50 within a second groove 129. The cone 40 comprises a hollow cup-like structure defining a cone cavity 42. The cone 40 further comprises a substantially horizontal upper cone edge 44. The upper cone edge 44 is captured within and held in place by the first groove 128 of the flapper body 20. The cone 40 further comprises an upper cone wall 43 having an outer surface 41 and a cone bottom 45 having an opening 46 defined in it. The upper cone wall 43 likewise has a plurality of openings 47 defined in it, the openings 47 facing forwardly of the flapper body 20. These openings 47 work with the vent ring 50 to control air outflow from the cone cavity 42. Further, the cone 40 comprises a polarizing tab (not shown) to ensure proper positioning of the cone 40 relative to the flapper body 20. In other words, the cone 40 is attached and polarized in one position so that the holes or openings 47 in the cone 40 can only be positioned one way, which is forward. In short, the cone 40 is integral with the flapper body 20 and does not rotate. Lastly, the cone 40 comprises a plurality of snap tabs 48 extending outwardly from the outer surface 41 of the upper cone wall 43. The snap tabs 48 are used to maintain the vent band 50 in a position such that the band 50 is rotatable about the upper cup wall 43 but is not able to move vertically relative to that wall 43. The upper cup wall 43 further comprises indicia 140 to indicate to the user that the rotatable band 50 is functionally disposed about the cone 40 in several positions. See FIG. 6.

Figure 9:
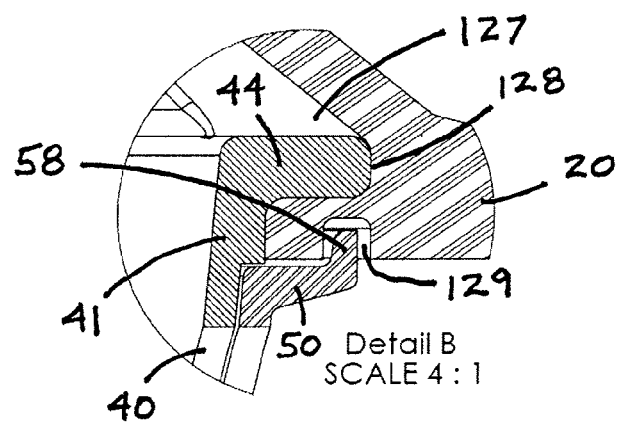
FIG. 9 is an enlarged side and partially sectioned view of the captive portions that are built into the flapper body of the flapper valve of the present invention and showing how an edge of the cone is captured and how an edge of the rotatable vent ring is captured as well.

The rotating vent band 50 comprises a flat ring-like structure comprising a cylindrical band body 52 having an inner surface 51, an outer surface 53, an upper band body lip 58 and a plurality of support ribs 54. As shown in FIG. 9, the upper band body lip 58 is receivable within the second groove 129 of the captive portion 127 of the flapper body 20, the band body 52 further being rotationally-movable about the outer surface 41 of the upper cone wall 43 of the cone 40. The vent band body 52 further comprises a substantially plurality of circular apertures 56. The vent band body 52 is rotatable to place the apertures 56 in several different positions to achieve desired air flow out of the cone cavity 42. In short, the vent band 50 is a locking device that captures the flapper body 20 and the cone 40. That is, it is a metering device that rides on the edge of the cone 40 which prevents binding during rotation. The vent band 50 further provides detents (not shown) which allow the band 50 to be positioned in specific settings.

The present invention also contemplates use of the flapper valve 10 in combination with a flush valve as described at the beginning of this disclosure. This use would be an assembly of the type that could be installed within the tank of a conventional toilet.

What is claimed is:
1. A toilet flapper valve comprising:
a flapper body comprising a generally circular forward portion and a pair of leg clip mounting structures disposed rearwardly of the generally circular forward portion, the leg clip mounting structures further comprising a rearward flat and a generally frustoconical retainer; and a pair of leg clips each comprising a mounting leg comprising a forward facing flat having an aperture, the aperture being sized sufficiently to accommodate the frustoconical retainer to secure the leg clip mounting structures of the flapper body and a clip portion, the clip portion comprising a first clip member and a second clip member, the first and second leg clips attachable to the leg clip mounting structures and wherein the leg clips are rotatable about the frustoconical retainer from a first position in which the clip portions are relatively closer to one another to a second position wherein the clip portions are relatively farther apart.

2. The toilet flapper valve of claim 1 wherein the generally frustoconical retainer further comprises a peripheral groove that is disposed immediately adjacent the rearward flat of the leg clip mounting structure.

3. The toilet flapper valve of claim 1 wherein the leg clip mounting structures further comprise a plurality of support ribs extending forwardly from the leg clip mounting structures.

4. The toilet flapper valve of claim 1 wherein the frustoconical retainer is resiliently compressed so as to permit the frustoconical retainer to be inserted through the aperture in the leg clip up to a peripheral groove adjacent the rearward flat of the leg clip mounting structure.

5. The toilet flapper valve of claim 1 wherein the flapper body further comprises a cone disposed below the flapper body and a rotating vent band disposed below the flapper body and about the cone.

6. The toilet flapper valve of claim 1 wherein the flapper body further comprises a rubber material having a chemical resistant chlorazone additive.

\* \* \* \* \*